United States Patent Office 3,629,253
Patented Dec. 21, 1971

3,629,253
FLUORINATED 1,2-DIHYDRO-1,2,4-BENZOTRIAZINES
Theodor Wagner-Jauregg, Zofingen, Switzerland, and Egon Fitz, Dornbirn, Austria, assignors to Siegfried Aktiengesellschaft, Zofingen, Switzerland
No Drawing. Filed Sept. 27, 1968, Ser. No. 763,349
Claims priority, application Switzerland, Sept. 27, 1967, 13,517/67
Int. Cl. C07d 55/10
U.S. Cl. 260—247.2 A    5 Claims

ABSTRACT OF THE DISCLOSURE

This invention is directed to fluorinated 3-amino substituted 1,2-dihydro-1,2,4-benzotriazine derivatives having pharmaceutical and particularly antiphlogistic activity, and to the method of producing same by reducing the corresponding fluorinated 3-amino substituted 1,2,4-benzotriazine-1-oxide derivatives.

The present invention relates to therapeutically valuable fluorinated compounds of the general formula

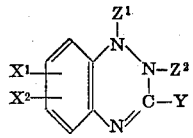

(I)

wherein $X^1$ and $X^2$ are identical or different members selected from the group consisting of hydrogen, halogen and lower alkyl radicals, at least one X being a member selected from the group consisting of fluorine and fluorinated lower alkyl, that is lower alkyl radicals substituted by at least one fluorine atom; Y is a tertiary amino group, and $Z^1$ and $Z^2$ are identical or different members selected from the group consisting of hydrogen and acyl radicals where both Z's together may represent the diacyl biradical of a dibasic acid which may be substituted by lower alkyl radicals.

The novel compounds of the invention are preferably prepared by treating a 1,2,4-benzotriazine-1-oxide of the general formula

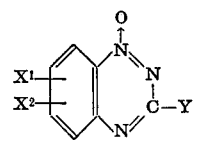

(II)

wherein X and Y have the above mentioned signification, with reducing agents and isolating the reduction product in the form of a crystalline salt with acids or as an acyl derivative. The 1,2-malonyl derivatives give salts with bases.

In the United States Patent No. 3,349,088, 1,2-dihydro-1,2,4-benzotriazine derivatives have been disclosed which exert when perorally or parenterally administered to mammals good antiphlogistic effects and are valuable therapeutics. It has now been found that the same activities are obtained in a more pronounced degree with the novel compounds of the present invention. For example in the rat paw edema test (see Helv. Physiol. Acta 21, 65 (1963)) with peroral administration of 3-dimethylamino-7-fluoro-1,2-dihydro-1,2,4-benzotriazine in 5% aqueous solution containing an equivalent amount of sodium hydroxide, an $ED_{50}$ value of 72 mg./kg. rat was determined, and with 3 - dimethylamino - 7-trifluoromethyl - 1,2 - dihydro-1,2,4-benzotriazine and 1,2-(isopropylmalonyl) - 3-dimethylamino-7-trifluoromethyl-1,2-dihydro-1,2,4-benzotriazine the corresponding values were found to be 47 and 56 mg./kg. rat respectively. These data prove a surprisingly high level of antiphlogistic activity.

Compounds of the general Formula I which may be used for such purposes are for example the 1,2-dihydro-3 - dimethylamino-7-fluoro-1,2,4-benztriazine hydrochloride (M.P. 289° C.) and the hydrochlorides of the following 1,2-dihydro-7-trifluoromethyl-1,2,4-benzotriazine derivatives:

the 3-dimethylamino derivative (M.P. 222–225° C.)
the 3-diethylamino derivative (M.P. 229–231° C.)
the 3-pyrrolidino derivative (M.P. 222–225° C.)
the 3-piperazino derivative (M.P. 224–228° C.)
the 3-morpholino derivative (M.P. 197–200° C.)

and in particular the 1,2-diacyl derivatives of the general formula

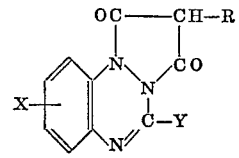

having the following substituents:

| X | Y | R | M.P. |
|---|---|---|---|
| 7-fluoro | Dimethylamino | n-Propyl | 225–228° C. (monohydrate: 130° C.). |
| Do | do | Iso-propyl | 192–194° C. (monohydrate: 104–108° C.). |
| Do | do | n-Butyl | 211–213° C. |
| 7-trifluoromethyl | do | n-Propyl | 182–183° C. |
| Do | do | Iso-propyl | Monohydrate: 90–100° C. |
| Do | do | n-Butyl | 203–205° C. |
| Do | do | Sec. butyl (1-methyl-propyl) | Hemihydrate: 138–144° C. |
| Do | do | n-Pentyl-(1) | 206–210° C. |
| Do | do | n-Pentyl-(2) (1-methylbutyl) | Monohydrate: 102–104° C. |
| Do | do | Iso-pentyl (3-methylbutyl) | 219–221° C. |
| Do | do | Ethoxy | Monohydrate: 149–150° C. |
| Do | Piperidino | n-Propyl | 235–241° C. |
| Do | do | n-Butyl | 227–232° C. |

The fluorinated 1,2,4-benzotriazine-1-oxide derivatives which are used as a starting material for the method of the present invention can be prepared by known methods such as for example from p-fluoro-o-nitro aniline (see J. Org. Chem. 16, 1451 (1951)) or p-trifluoromethyl-o-nitroaniline (see Chem. Abstr. 54, 4430g (1960)) whose amino radical is converted into the ureido radical by treating the said compounds with phosgene dissolved in toluene and subsequently with an aqueous solution of ammonia. By heating with an aqueous solution of sodium hydroxide the so obtained intermediate product is cyclized to give 3 - hydroxy - 7-fluoro-1,2,4-benzotriazine - 1-oxide and 3-hydroxy-7-trifluoromethyl-1,2,4-benzotriazine-1-oxide respectively. By treatment of these products with phosphorus oxychloride and dimethylaniline their hydroxy radical is replaced by a chlorine atom, for which an amino radical is substituted by reaction with an amine, for example with dimethylamine dissolved in ethanol.

EXAMPLE 1

To a solution of 4.5 g. 3-dimethylamino-7-fluoro-1,2,4-benzotriazine-1-oxide in 150 cm.³ absolute alcohol 0.5 g. of a palladium catalyst (5% Pd on charcoal) are added. The mixture is agitated at 20° C. in the presence of hydrogen of atmospheric pressure. When after about half an hour no further absorption of hydrogen is observed, the mixture is filtered through diatomite. Then the solvent is evaporated at normal pressure, while a slow stream of nitrogen is passed through the solution. The residue is treated with a mixture of 30 cm.³ absolute benzene, 60 cm.³ absolute xylene and 6 g. propylmalonic acid diethylester. From the so obtained solution alcohol and benzene are distilled off as an azeotropic mixture. To the remaining xylene solution sodium ethylate is prepared by reacting and 15 cm.³ ethanol is added. The reaction mixture is heated to 110° C. for 1½ hours and to 150° C. for one hour while a part of the alcohol and xylol are evaporated. The cooled suspension is treated with 30 cm.³ ether and 50 cm.³ water and shaken in a separating vessel. After weak acidification with acetic acid the crude product separates from the aqueous solution. After recrystallization in 25 parts of acetic acid the 1,2-propylmalonyl-3-dimethylamino-7-fluoro-1,2-dihydrobenzotriazine is obtained as monohydrate in the form of long needles. Yield: 4.5 g. (65%); M.P. 140–145° C. After heating over 150° C. it solidifies as a granular crystalline mass, and at temperatures of more than 180° C. it is transformed by sublimation into druses having a M.P. of 225–288° C.

$C_{15}H_{17}FN_4O_2 \cdot H_2O$ (322.33).—Calc. (percent): C, 55.89; H, 5.94; F, 5.89; $H_2O$, 5.60. Found (percent): C, 55.77; H, 6.16; F, 5.79; $H_2O$, 6.40.

EXAMPLE 2

17 g. 3-dimethylamino-7-trifluoromethyl-1,2,4-benzotriazine-1-oxide are dissolved in 800 cm.³ ethyl alcohol and 2 g. of a palladium catalyst (5% Pd on charcoal) as well as 80 cm.³ hydrochloric acid (d.=1.19) are added. The mixture is agitated at 20° C. in the presence of hydrogen of atmospheric pressure. After about 24 hours the calculated amount of 2 mol of hydrogen is absorbed. Then, the catalyser is separated by filtration through diatomite. The solution is concentrated under reduced pressure and the residue is dissolved in isopropanol. After filtration of the cooled solution 15.7 g. white coloured 3 - dimethylamino - 7 - trifluoromethyl-1,2-dihydro-1,2,4-benzotriazine in the form of its hydrochloride are obtained. By concentrating the mother liquor, further 1.4 g. of the substance are isolated. Yield 17.1 g. (92%).

$C_{10}H_{11}F_3N_4 \cdot HCl$ (280.69).—Calc. (percent); N, 19.96; Cl, 12.63. Found (percent): N, 19.54; Cl, 12.75.

For converting the so obtained hydrochloride salt into an acyl derivative, 3.05 g. triethylamine are added at once to a solution of 5.6 g. of the hydrochloride salt in 50 cm.³ dioxane of room temperature kept under nitrogen. Then, a solution of 4 g. n-butylmalonic acid dichloride in 20 cm.³ dry dioxane is added dropwise while stirring. After having been stirred during a period of 2 hours at 60° C., the mixture is concentrated under reduced pressure. The residue is dissolved in 180 cm.³ of 1 N sodium hydroxide solution and shaken with 100 cm.³ ether. The separated aqueous layer is acidulated with acetic acid while stirring and cooling, whereby the reaction product precipitates in crystalline form. For purification the crude product is dissolved in 80 cm.³ acetic acid, filtered again and precipitated by addition of 200 cm.³ water. The so obtained white product is collected on a suction filter, washed with water and dried over phosphorus pentoxide at 20° C. and a pressure of 0.01 mm. Hg, giving 1,2-butylmalonyl - 3 - dimethylamino-7-trifluoromethyl-1,2-dihydro-1,2,4-benzotriazine monohydrate. Yield: 5.2 g. (68% calculated on the hydrochloride). The monohydrate melts at 101–102° C.; at 150–160° C. it solidifies, and at 204–209° C. it melts again under decomposition.

$C_{17}H_{19}F_3N_4O_2 \cdot H_2O$ (386.37).—Calc. (percent): C, 52.84; H, 5.48; N, 14.50; F, 14.75. Found (percent) C, 53.01; H, 5.48; N, 15.65; F, 14.60.

We claim:

1. A fluorinated 1,2-dihydro-1,2,4-benzotriazine derivative having the formula

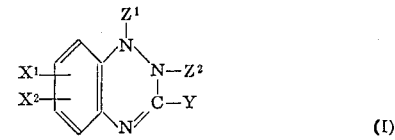

(I)

wherein $X^1$ and $X^2$ are independently selected from the group consisting of hydrogen, halogen, fluorinated lower alkyl, and lower alkyl, at least one of $X^1$ and $X^2$ being a member selected from the group consisting of fluorine and fluorinated lower alkyl; Y is selected from the group consisting of di-loweralkyl amino, pyrrolidino, piperazino, morpholino and piperidino; $Z^1$ and $Z^2$, when independent groups are hydrogen, and $Z^1$ and $Z^2$, when linked together, represent the diacyl di-radical of an acid selected from the group consisting of lower alkane dibasic carboxylic acids and lower alkane dibasic carboxylic acids whose alkylene group is substituted with lower alkoxy.

2. A fluorinated 1,2-dihydro-1,2,4-benzotriazine derivative according to claim 1, wherein $X^1$ is a member selected from the group consisting of fluorine and trifluoromethyl and $X^2$ is hydrogen.

3. A fluorinated 1,2-dihydro-1,2,4-benzotriazine derivative according to claim 1, wherein $Z^1$ and $Z^2$ when linked together represent the bi-radical of a malonic acid having the formula HOOC—CHR—COOH wherein R represents a lower alkyl radical.

4. A compound according to claim 2, wherein $Z^1$ and $Z^2$ are hydrogen.

5. A compound according to claim 2, wherein $Z^1$ and $Z^2$ are linked together.

References Cited

UNITED STATES PATENTS

| | | | |
|---|---|---|---|
| 2,388,608 | 11/1945 | Emerson | 260—689 X |
| 3,079,390 | 2/1963 | Jiu et al. | 260—249.5 |
| 3,137,693 | 6/1964 | Carbon | 260—249.5 X |
| 3,386,991 | 6/1968 | Gerber | 260—689 X |

JOHN M. FORD, Primary Examiner

U.S. Cl. X.R.

260—247.5 R, 249.5, 999